US012729716B2

(12) United States Patent
Kullin et al.

(10) Patent No.: US 12,729,716 B2
(45) Date of Patent: Sep. 8, 2026

(54) ANGULAR CONTACT SELF-ALIGNING TOROIDAL ROLLING ELEMENT BEARING

(71) Applicant: AKTIEBOLAGET SKF, Gothenburg (SE)

(72) Inventors: Arne Lars Jonas Kullin, Landvetter (SE); Andreas Lofqvist, Torslanda (SE)

(73) Assignee: AKTIEBOLAGET SKF, Gothenburg (SE)

( * ) Notice: Subject to any disclaimer, the term of this patent is extended or adjusted under 35 U.S.C. 154(b) by 91 days.

(21) Appl. No.: 18/710,744

(22) PCT Filed: Nov. 10, 2022

(86) PCT No.: PCT/EP2022/081402
§ 371 (c)(1),
(2) Date: May 16, 2024

(87) PCT Pub. No.: WO2023/094168
PCT Pub. Date: Jun. 1, 2023

(65) Prior Publication Data

US 2025/0012325 A1 Jan. 9, 2025

(30) Foreign Application Priority Data

Nov. 24, 2021 (DE) ......................... 102021213234.0

(51) Int. Cl.
*F16C 23/08* (2006.01)

(52) U.S. Cl.
CPC ........ *F16C 23/086* (2013.01); *F16C 2360/31* (2013.01)

(58) Field of Classification Search
CPC ............................ F16C 23/086; F16C 23/088
See application file for complete search history.

(56) References Cited

U.S. PATENT DOCUMENTS 3,963,285 A 6/1976 Kellstrom
3,990,753 A * 11/1976 Kellstrom .............. F16C 33/58 384/450

(Continued)

FOREIGN PATENT DOCUMENTS

DE 102006050940 A1 * 4/2008 ............ F16C 23/086
EP 3020987 B1 4/2020
WO 2015057126 A1 4/2015

OTHER PUBLICATIONS

Translation of DE102006050940 obtained Nov. 12, 2025.*
International Search Report and Written Opinion dispatched Jun. 1, 2023 in parent application No. PCT/EP2022/081402.

*Primary Examiner* — James Pilkington
(74) *Attorney, Agent, or Firm* — J-TEK LAW PLLC; Scott T. Wakeman; Mark A. Ussai

(57) ABSTRACT

An angular contact toroidal rolling element bearing includes an inner ring, an outer ring, a set of rollers arranged between the inner and outer rings, and a cage having a plurality of pockets, each pocket retaining one of the rollers. Each roller has a curved raceway-contacting surface arranged for being in load carrying contact with a curved inner raceway of the inner ring and in load carrying contact with a curved outer raceway of the outer ring. A contact angle between each roller and the inner and/or outer raceway is inclined, and each roller is arranged to self-orient in its axial direction in relation to the inner and outer rings in a loaded zone during operation of the bearing. At least one of the pockets present an inclination angle in relation to an orbital trajectory of rotation of the rolling elements during operation of the bearing.

13 Claims, 4 Drawing Sheets

(56) References Cited

U.S. PATENT DOCUMENTS

| | | | | |
|---|---|---|---|---|
| 4,227,754 | A * | 10/1980 | Kellstrom | F16C 33/34 384/450 |
| 4,403,813 | A * | 9/1983 | Schaefer | F16C 33/467 384/450 |
| 5,145,267 | A * | 9/1992 | Takata | F16C 23/086 384/558 |
| 2019/0113073 | A1 * | 4/2019 | Kullin | F16C 19/542 |

* cited by examiner

ANGULAR CONTACT SELF-ALIGNING TOROIDAL ROLLING ELEMENT BEARING

CROSS-REFERENCE

This application is the U.S. National Stage of International Application No. PCT/EP2022/081402 filed on Nov. 10, 2022, which claims priority to German patent application no. 10 2021 213 234.0 filed on Nov. 24, 2021.

TECHNICAL FIELD

The present invention relates to rolling element bearings. More specifically, the present invention relates to an angular contact self-aligning toroidal roller bearing comprising an inner ring, an outer ring, a set of rolling elements formed of rollers arranged in an intermediate configuration between the inner and outer rings and a cage with pockets for retaining the rolling elements. The present invention also relates to a machinery comprising an angular contact self-aligning toroidal roller bearing. The present invention further relates to a method for manufacturing an angular contact self-aligning toroidal rolling element bearing.

BACKGROUND OF THE INVENTION

In a typical application, a rolling bearing arrangement may be arranged to accommodate misalignment, shaft deflections and thermal expansion of the shaft. To cope with misalignment and shaft deflections, design engineers conventionally use a self-aligning bearing arrangement consisting of two self-aligning ball bearings or two spherical roller bearings. However, thermal expansion of the shaft is a complex issue and one of the bearings is often arranged as a "locating" bearing and the other as a "non-locating" bearing. For example, the locating bearing may be secured in the housing and on the shaft and the non-locating bearing may be arranged to be able to move axially on its seat in the housing. However, the movement in relation to the housing of the non-locating bearing typically generates a considerable amount of friction, which then induces vibration, axial forces in the bearing system, and heat-all of which can significantly reduce bearing service life.

For various applications, a known solution involves utilizing a toroidal rolling element bearing, which is a self-aligning radial bearing having an inner ring that moves independently of the outer ring, enabling e.g. thermal elongation and contraction of the shaft or structure due to temperature variations without inducing internal axial loads. Furthermore, since the inner and outer rings of a toroidal roller bearing can be mounted with an interference fit, problems associated with a loose outer ring, such as fretting corrosion and distortion of the ring may be avoided.

However, for applications involving thrust loads, design engineers are required to cope with high axial loads, misalignment and shaft deflections. A known solution is to use toroidal bearings with angular contact, so called angular contact self-aligning toroidal rolling element bearings. In these bearings, the rolling elements are steered by the internal geometry, such as the shape of the rolling elements and curvature of the raceways, to find an optimum position based on current load conditions. However, for larger contact angles, a guiding flange may be needed to prevent the rolling elements from going too far outside its intended track, thus, to help guide the rolling elements in position. The use of a guiding flange interferes with the intended function of letting the internal geometry guide the roller in position, causing friction and wear of the bearing, consequently power losses and shorter service life of the machinery in which it is installed.

SUMMARY OF THE INVENTION

In view of the above, a first object of the present invention is to provide an improved angular contact self-aligning toroidal rolling element bearing which to at least some extent overcomes some of the issues of the prior art. A further object of the invention is to provide an improved method for manufacturing an angular contact self-aligning toroidal rolling element bearing. A yet further object is to provide an improved machinery comprising an angular contact self-aligning toroidal rolling element bearing.

These and other objects are met by the subject matters provided in the independent claims. Preferred embodiments of the invention are presented in the dependent claims.

According to a first aspect thereof, the present invention relates to an angular contact self-aligning toroidal rolling element bearing comprising an inner ring, an outer ring, and a set of rolling elements formed as rollers arranged in between the inner and outer rings, and a cage comprising pockets, each pocket for retaining a roller of the set of rolling elements. Each roller has a curved raceway-contacting surface arranged for being in load carrying contact with a curved inner raceway of the inner ring and in load carrying contact with a curved outer raceway of the outer ring. A contact angle between each roller and the inner and/or outer raceway is inclined, and each roller is arranged to self-orient in its axial direction in relation to the inner and outer rings in a loaded zone during operation. At least one of the pockets present a cage pocket inclination angle in relation to an orbital trajectory of rotation of the set of rolling elements during operation.

For angular contact self-aligning toroidal rolling element bearings, each roller is arranged to orient itself in its axial direction in relation to the inner and outer ring based on changing running conditions of the bearing. For example, during the changing running conditions involving misalignment of the structural members of the bearing, load changes, for example entering and leaving the loaded/unloaded zone, or ring deformations, displacements or twistings, etc. By axial self-orientation of the rollers, self-balancing is achieved leading to symmetric stress distributions and the avoiding of unfavorable roller edge loading under typical running conditions.

By the provision of the angular contact self-aligning toroidal rolling element bearing as disclosed herein, an improved bearing is provided that can better handle changing running conditions involving higher axial loads, yet without the use of a guiding flange.

In particular, it has been realized that if a cage pocket provides an inclination angle in relation to an orbital trajectory of rotation of the set of rolling elements, instead of being symmetrical to it, the cage pocket can help to guide the roller in the unloaded zone so that it can enter the loaded zone having a more beneficial skew angle and find its optimum position based on the present bearing running conditions faster.

As such, the cage pocket may steer the roller in the unloaded zone where forces are smaller, and may steer less, or not at all in the loaded zone where forces are larger. Accordingly, forces generated between the cage and the rolling elements are reduced, reducing generated friction and wear of the bearing. Further, as the cage pocket inclination angle may steer the roller in the unloaded zone it also helps the roller to find a stable skew angle and its optimum position based on bearing load conditions faster as it enters the loaded zone, it is thereby increasing the performance of the bearing. Further, as the roller find a stable skew angle faster and can displace itself in an axial direction of the bearing faster, the inventors have realized that a guiding flange can be omitted from the bearing design. As such, the bearing is improved in that it is allowed to position the roller in a stable skew angle and find its optimum position based on bearing load conditions faster, without interference from a guiding flange. Further, as the guiding flange can be omitted, a more cost-efficient bearing can be provided.

Loaded and unloaded zones of a bearing are well known terms in the fields of bearings. For example, a bearing supporting a shaft may typically have a loaded zone underneath the shaft supporting the load of the shaft, whereas the zone above the shaft may be the unloaded zone. As such, the bearing is compressed in the loaded zone, yet may comprise a gap in between the rolling elements and the rings in the unloaded zone. The zones may vary depending on the type of bearing and the application in which it is mounted. The loaded zone may also vary in the same bearing as the running conditions of the application in which it is installed changes. The loaded zone may also be 360° around the bearing axis such that all rollers are carrying load and there's no unloaded zone, i.e., no gap is present between the raceways and the rollers. Here, the loaded zone may be defined as the zone in which the rollers are steered by the raceways.

By orbital trajectory of rotation of the set of rolling elements is meant the orbital path the set of rolling elements have around the bearing center axis when the bearing is in operation. By the bearing being in operation is meant that the bearing rings rotates relative each other, and the rolling elements travel therebetween, limited by the shape of the inner and outer ring raceways, thereby presenting and orbital trajectory of rotation. It should be understood that the individual rolling elements may skew and turn to slightly different trajectories, for example when they travel through a loaded and unloaded zone. Even so, again, the orbital trajectory of rotation should be understood as the orbital path the whole set of rolling elements have as they travel around the bearing center axis when the bearing is in operation.

By a rolling element's axial center portion is meant the portion along the rolling element's axial center axis from where the axial distances to its two end faces are equal. By a rolling element's radial axis is meant an axis extending radially through the axial center portion, i.e. extending perpendicularly to the rolling element's axial axis in the axial center portion.

By a bearing's axial direction is meant direction in line with the bearing's rotational center axis. By a bearing's radial direction is meant a direction perpendicular to the bearing's center axis. When the rolling element is arranged to self-orient itself in its axial direction is meant that it is positioning itself along the roller's own axial extension. This means along an axial axis going through the center of the two end faces of the roller, in the case when the rolling elements are in the shape of a roller. With reference to FIG. 1, the dotted line going through the roller with an angle D from the bearing center axis may be used as reference of an example of what is meant with a rolling element's axial direction. By a rolling element's radial direction is meant a direction perpendicular to the rolling element's axial direction. When the rolling element is arranged to self-orient itself in its axial direction, the roller is thereby positioning itself in the bearing's axial and bearing's radial direction as defined above, given there is an angular contact angle CA between the contacting surfaces of the rollers and the raceway surfaces in an angular contact self-aligning toroidal rolling element bearing. The contact angle CA may be defined as the angle of the line along which the resulting load is transmitted via a rolling element from one raceway to another, typically along an axial center portion of the rolling element, in relation to the normal direction of the bearing's rotational center axis. A contact angle CA can be seen in FIG. 1 as the angle between a dotted line perpendicular to the rolling element's axial direction, reaching through the contact areas of the rings and the rolling element, and the center axis C. The contact angle CA is key for providing sufficiently high axial load carrying capacity of the bearing.

The function where the rolling elements are arranged to self-orient itself in its axial direction is sometimes referred to as the "soap effect". The "soap effect" term plays on the effect when grabbing a soap bar formed as a wedge with your hands, i.e. it is prone to self-orient itself based on how one would apply loads with the hands. The soap effect in this setting means that the shape of the ring raceways pushes the rolling element to its optimal position between the raceways for optimum load distribution through the roller based on current load conditions.

When the bearing conditions are known, such as the rotating direction of the rings and the internal geometry of the bearing, the roller will skew at a certain angle when it enters the loaded zone. A benefit of having a cage pocket with an inclination angle in the direction to which the roller skews, friction and wear may be greatly reduced when the roller and cage may come in contact in the loaded zone.

Optionally, the cage pocket inclination angle substantially corresponds to a roller skew angle of the rollers in the loaded zone in relation to the orbital trajectory of rotation of the set of rolling elements during operation. The optimum skew angle of the roller can be estimated given a fixed rotational direction of the rings and the bearing running conditions based on the application in which it is mounted. By aligning the cage pocket inclination angle accordingly, the friction between the cage and rolling elements can be significantly reduced.

Optionally the cage pocket inclination angle is ranging from 0.1 milli-radians to 20 milli-radians, or from −0.1 milli-radians to −20 milli-radians in view of the orbital trajectory of rotation of the set of rolling elements. The rolling element may have a positive skew angle or a negative skew angle, when seen from a rolling direction of the rolling element. The cage pocket inclination angle can be chosen based on this positive or negative skew angle.

Optionally, the contact angle CA is 5 degrees or more, preferably 10 degrees or more, even more preferably 20 degrees or more. Further optionally the contact angle CA is between 10 and 45 degrees, or between 15 and 35 degrees. The inventors have realized that the solution according to any embodiment as mentioned herein is particularly beneficial when the contact angles CA are larger, as the rolling element are in need of more efficient steering when the rolling elements are more effected by the force of gravity.

Optionally, the angular contact self-aligning toroidal rolling element bearing is a large sized bearing, such as a bearing having an external diameter of 500 mm or more.

According to another aspect of the invention a machinery comprising an angular contact self-aligning toroidal rolling element bearing according to any one of the embodiments as presented herein is provided.

Optionally, the machinery is a is a machinery exposed to alternating radial and alternating axial loads, such as a wind turbine. The rotating direction of a main shaft of a wind turbine can be also be controlled so that it always rotates at a specific rotating direction by adjusting the slew angle of the blades, making the wind turbine a suitable application for an angular contact bearing according the an embodiment of the present invention above, as the skew angle of the rolling elements may be estimated in a reliable manner. Although a wind turbine is particularly mentioned, it should be understood that also other applications and/or machinery where the rotating direction of the shaft is known are suitable for an angular contact self-aligning toroidal rolling element bearing according to any one of the embodiments as presented herein.

According to another aspect of the invention, a method for manufacturing an angular contact self-aligning toroidal rolling element bearing is provided. The bearing comprising:

an inner ring, an outer ring, a set of rolling elements formed as rollers arranged in between the inner ring and outer ring, and wherein each roller has a curved raceway-contacting surface arranged for being in load carrying contact with a curved inner raceway of the inner ring and in load carrying contact with a curved outer raceway of the outer ring. A contact angle between each roller and/or the inner and outer raceway is inclined in relation to a bearing axis. Each roller is arranged to self-orient in its axial direction in relation to the inner ring and the outer ring in a loaded zone during operation. The method comprising steps of:

providing an angular contact self-aligning toroidal rolling element bearing, and further providing a cage comprising pockets, each pocket for retaining a roller of the set of rolling elements, wherein at least one of the pockets presents a cage pocket inclination angle in relation to an orbital trajectory of rotation of the set of rolling elements during operation.

Optionally, the method comprises providing a cage pocket inclination angle that substantially corresponds to a roller skew angle of the rollers in the loaded zone in relation to the orbital trajectory of rotation of the set of rolling elements during operation.

Optionally, the method comprises providing a cage pocket inclination angle ranging from 0.1 milli-radians to 20 milli-radians, or from −0.1 milli-radians to −20 milli-radians.

The angular contact toroidal rolling element bearing according to any embodiment as presented herein is advantageous in that it can accommodate both radial loads and axial loads while reducing generated friction. This is due to the optimized design of the cage pocket inclination angle combined with the knowledge of roller behaviour in view of internal bearing geometries and estimated load conditions. Optionally, a plurality of angular contact toroidal rolling element bearings may be used to form a bearing arrangement for supporting a rotating shaft. For example, it may be used in a face-to-face or back-to-back arrangement with another bearing taking up the axial load in the other direction. Due to their robust design, toroidal bearings can for instance cope with small deformations and machining errors of the bearing seat. The rings accommodate these small imperfections without the danger of roller edge stresses. The high load carrying capacity plus the ability to compensate for small manufacturing or installation errors provide opportunities to increase machine productivity and uptime. Together with high axial load carrying capacity of the angular contact toroidal rolling element bearing, this means that for the same bearing size in an application arrangement, performance can be increased and/or or service life extended. Also, new machine designs can be made more compact to provide the same, or even better performance.

Generally, other objectives, features, and advantages of the present invention will appear from the following detailed disclosure, from the attached dependent claims as well as from the drawings are equally possible within the scope of the invention.

BRIEF DESCRIPTION OF THE DRAWINGS

Embodiments of the invention will now be described, by way of example, with reference to the accompanying drawings, wherein.

Figure 1:
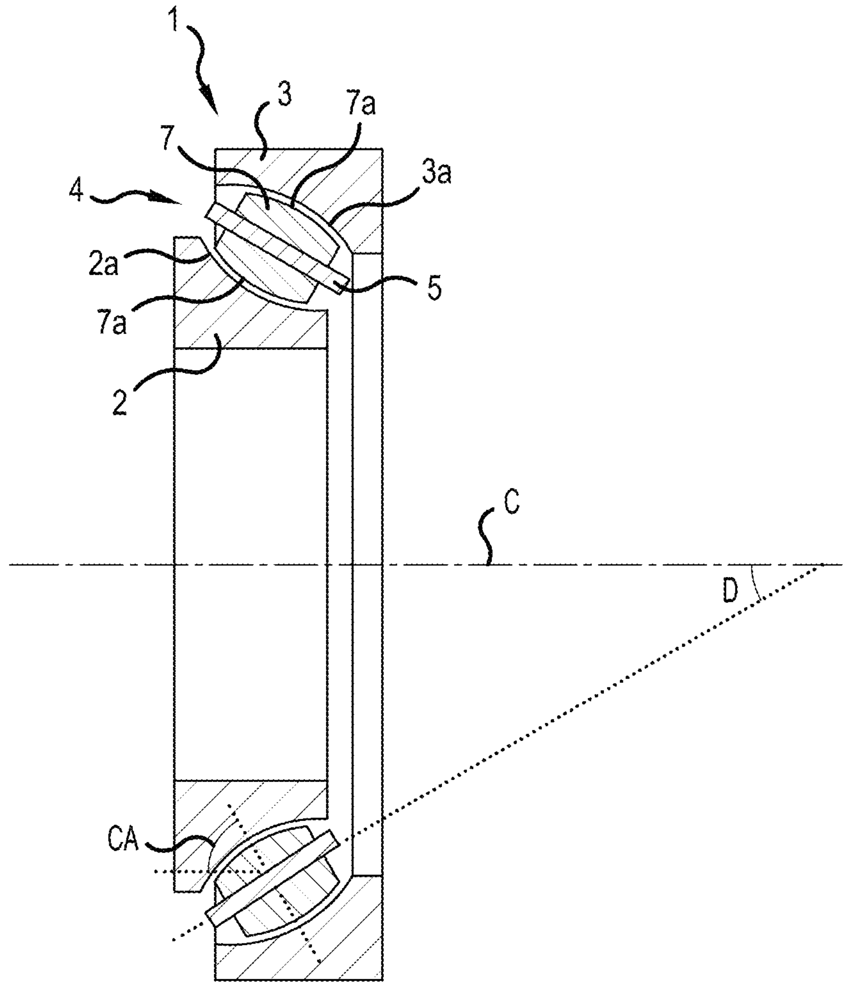
FIG. 1 is a schematic cross-sectional view of an exemplifying embodiment of an angular contact self-aligning toroidal rolling element bearing according to the present invention.

It should be understood that the drawings are not true to scale and, as is readily appreciated by a person skilled in the art, dimensions other than those illustrated in the drawings are equally possible within the scope of the invention.

DETAILED DESCRIPTION

In the drawings, similar, or equal elements are referred to by equal reference numerals.

FIG. 1 depicts a schematic cross-sectional view of an exemplifying embodiment of an angular contact self-aligning toroidal rolling element bearing 1 according to the present invention. The cross-sectional view is defined by a plane which extends along a rotational center axis C of the bearing 1.

The bearing 1 illustrated in FIG. 1 comprises an inner ring 2, an outer ring 3, and a set of rolling elements 4 formed as rollers 7 arranged in an intermediate configuration between the inner and outer rings 2 and 3. Each roller 7 of the angular contact self-aligning rolling element bearing 1 is shown as an axially symmetrical bearing roller 7. Optionally, the rollers 7 may be axially asymmetrical. A cage 5 is shown retaining the rollers 7 of the set of rolling elements 4. As shown, the bearing 1 is a single row rolling element bearing 1.

Furthermore, each roller 7 has a curved raceway-contacting surface 7*a* arranged in contact with a curved inner raceway 2*a* of the inner ring 2, and in contact with a curved outer raceway 3*a* of the outer ring 3. As shown in FIG. 1, the contact angle CA between each roller 7 and the inner raceway 2*a* and the outer raceway 3*a* is inclined in relation to a bearing rotational center axis C and is complementary to a roller inclination angle as indicated by D. The toroidal curvature of the curved raceway-contacting surface 7*a* of each roller 7 and the toroidal curvature of the inner and outer raceways 2*a* and 3*a* are adapted to allow for self-orientation of the rollers 7 in the axial direction of the rollers 7. The toroidal curvature of the curved raceway-contacting surface 7*a* of each roller 7 corresponds to the toroidal curvature of the inner and outer raceways 2*a* and 3*a*.

Figure 6:
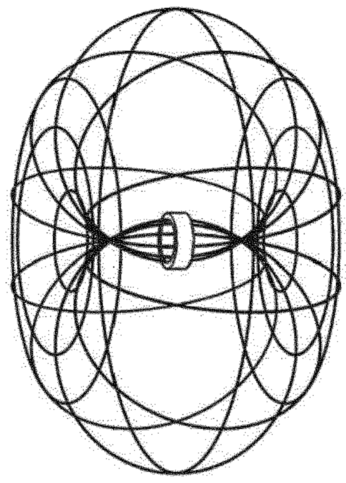
FIG. 6 is a schematic view of a torus shape in combination with a rolling element bearing.

The illustrated bearing 1 in FIG. 1 is a single row roller bearing 1 with relatively long, slightly crowned rollers 7. The inner ring 2 and outer ring 3 raceways 2*a* and 3*a* are correspondingly concave and symmetrical. The outer ring 3 raceway geometry is based on a torus, as schematically illustrated in FIG. 6, hence the term toroidal roller element bearing 1. The angular contact toroidal roller element bearing 1 is designed as a locating bearing 1 that allows for self-aligning ability, similar to the ability of a spherical roller bearing, and ability to allow for twisting displacements, such as twisting of any one or both of the rings and/or housing structure. Self-aligning capability and ability to allow for twisting displacement is for example particularly important in applications where there is misalignment as a result of shaft deflections. To compensate for these conditions, the bearing 1 may for example be arranged to accommodate misalignment up to 0.5 degrees between the bearing rings 2 and 3 without any detrimental effects on the bearing 1 or bearing service life. Further advantages are that the bearing 1 run cooler, the lubricant lasts longer and maintenance intervals can be appreciably extended.

Figure 2A:
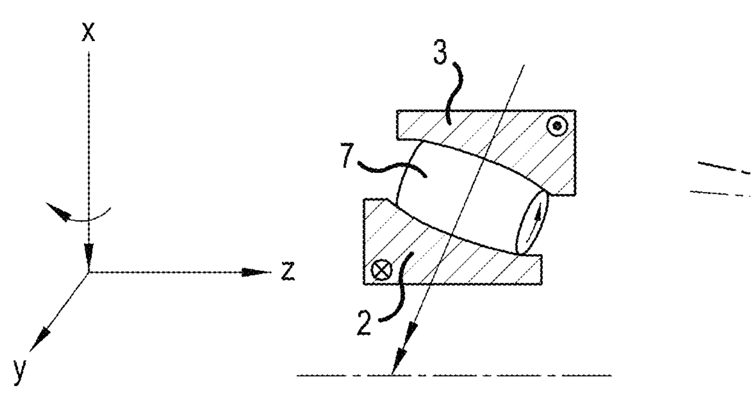
FIG. 2*a* is a schematic cross-sectional view of an exemplifying embodiment of an angular contact self-aligning toroidal rolling element bearing with a roller presenting a negative skew angle.

FIG. 2*a* depicts a schematic cross-sectional view of an exemplifying embodiment of an angular contact self-aligning toroidal rolling element bearing 1 with a roller 7 presenting a negative skew angle B. Here, the bearing 1 can be seen having an inner ring 2 and an outer ring 3 rotating relative to each other around the bearing's 1 rotational center axis C. The inner ring 2 moves relative to the outer ring 3 away from the viewer as signified by the marking of a circle with an X inside. The outer ring 3 is moving towards the viewer relative the inner ring 2, as signified by the marking of a circle with a dot. The roller 7 can be seen skewing around its radial axis as only one end face is shown. Further, the radial axis is shown with double arrows pointing radially towards the bearing's rotational center axis C along the roller's 7 central radial axle. Reference is made to the x,y,z coordinate table next to it showing the x-axle pointing towards the intersection of the z-axle and the y axle, and the negative skew in relation to the x,y,z coordinates.

Figure 2B:
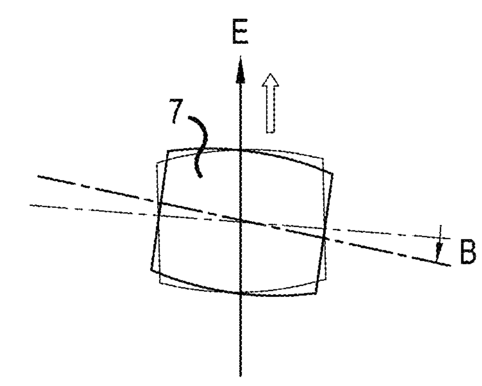
FIG. 2*b* is a top view of an exemplifying embodiment of a rolling element presenting a negative skew angle.

FIG. 2*b* depicts a top view of an exemplifying embodiment of a rolling element presenting a negative skew angle B. The rolling element is viewed from a central radial axis of the rolling element 7. Here, the rolling element is a roller 7. The roller 7 can be seen having a roller 7 direction as shown by the block arrow. Further, an orbital trajectory of rotation E is shown. By orbital trajectory of rotation E of the set of rolling elements 4 is meant the mean average angle the rolling elements 7 of the set of rolling elements 4 are having when seen from a central radial axis extending through an axial center portion of the rolling elements 7 as they travel a full lap around the bearing's 1 rotational center axis C. It should be understood that the individual rolling elements may skew and turn to slightly different directions as they travel through the loaded and unloaded zone, thereby presenting a different angle when seen from radial axis extending from an axial center portion of the rolling element, due to a space 6*a* for turning of the rolling elements 7 being provided within each pocket 6, as described below. Here, a roller 7 from the bearing 1 in FIG. 2*a* can be seen from its radial axis presenting a negative skew B is it is in a loaded zone of the bearing 1.

Figure 2C:
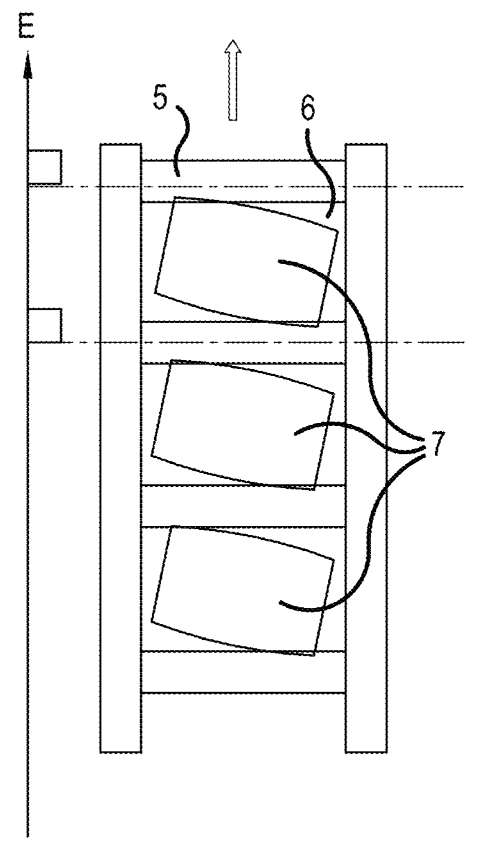
FIG. 2*c* is a top view of an exemplifying embodiment of a rolling element presenting a negative skew angle together with a cage having symmetrical cage pockets, according to prior art.

FIG. 2*c* depicts a top view of an exemplifying embodiment of a rolling elements presenting a negative skew angle B together with a cage 5 having symmetrical cage pockets 6, according to prior art. The rollers 7 can be seen having a roller 7 direction as shown by the block arrow. Further, an orbital trajectory of rotation E is shown. Here, the rolling element from FIGS. 2*a* and 2*b* can be seen in a loaded zone of a bearing 1 (not shown) in relation to a cage 5 of prior art having symmetrical cage pockets 6. By symmetrical pocket 6 is meant a cage pocket 6 that extends symmetrically in a direction perpendicular to the orbital trajectory of rotation E. As can be seen, the roller 7 presents a skew angle B and the symmetrical cage pocket 6 does not encompass the movement of the roller 7, causing friction and wear in the contact areas of the roller 7 and the cage 5. Further, the cage pocket 6 inhibits the roller's 7 ability to self-orient in its axial direction in relation to the inner ring 2 and outer ring 3 in a loaded zone during operation to take an optimum position based on the current load conditions. This further inhibits the performance of the bearing 1 in its load carrying abilities, causing more friction of the bearing 1 overall and decreasing the performance of the machinery 11 in which the bearing 1 is installed.

Figure 2D:
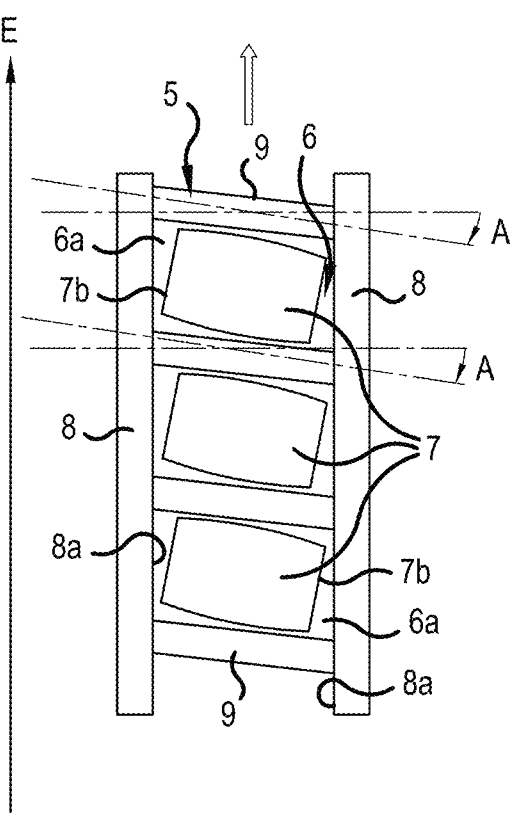
FIG. 2*d* is a top view of an exemplifying embodiment of a rolling element presenting a negative skew angle together with a cage having pockets presenting an inclination angle, according to the present invention.

FIG. 2*d* depicts a top view of an exemplifying embodiment of a rolling elements presenting a negative skew angle B together with a cage 5 having pockets 6 presenting an inclination angle A, according to the present invention. The cage 5 includes two side members 8 and a plurality of cross members 9 connecting the two side members 8, each cross member 8 being angled to establish the cage pocket inclination angle A. Each side member 8 has a surface 8*a* partially defining each pocket 6 which extends along the orbital trajectory of rotation E such that the space 6*a* for turning the rolling elements 7 is provided within each pocket 6 at the axial ends 7*b* of the rollers 7. Here, the rolling elements from FIG. 2*c* can be seen in a loaded zone of a bearing 1 (not shown). The cage pocket 6 can be seen presenting the inclination angle A, thereby encompassing the skew angle B of the roller 7 to a higher degree. As such, the problems with friction and wear as explained in FIG. 2*c* is significantly reduced. Further, the inclination angle A of the cage pockets 6 help to steer the rollers 7 in the unloaded zone into a skew angle B to quicker find its optimum axial position as it enters the loaded zone. As such, the cage 5 and the rollers 7 may of course be in contact in the unloaded zone as the cage pockets 6 steer the roller 7, but the generated forces and wear is significantly less compared to when the rollers 7 are in the loaded zone. The cage 5 and the rollers 7 may be in contact in the loaded zone as well, yet the inclination angle A reduces the problems with friction and wear as explained above, compared to symmetrical cage pockets 6. Optionally, the pocket 6 inclination angle A corresponds to the estimated roller 7 skew angle B in FIG. 2*b*.

Figure 3A:
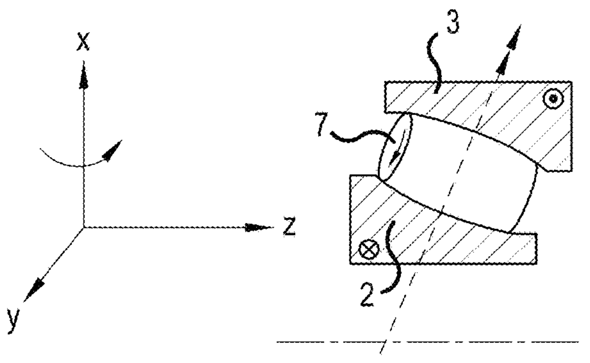
FIG. 3*a* is a schematic cross-sectional view of an exemplifying embodiment of an angular contact self-aligning toroidal rolling element bearing with a roller presenting a positive skew angle.

FIG. 3*a* depicts a schematic cross-sectional view of an exemplifying embodiment of an angular contact self-aligning toroidal rolling element bearing 1 with a roller 7 presenting a positive skew angle B. Here, the bearing 1 can be seen having an inner ring 2 and an outer ring 3 rotating relative to each other around the bearing's 1 rotational center axis C. The inner ring 2 moves relative the outer ring 3 away from the viewer as signified by the marking of a circle with an X inside. The outer ring 3 is moving towards the viewer relative the inner ring 2, as signified by the marking of a circle with a dot. The roller 7 can be seen skewing around its radial axis as only one end face is shown. Further, the radial axis is shown with double arrows pointing radially away from the bearing's rotational center axis C along the roller's 7 central radial axle. Reference is made to the x,y,z coordinate table next to it showing the x-axle pointing towards the intersection of the z-axle and the y axle, and the positive skew in relation to the x,y,z coordinates.

Figure 3B:
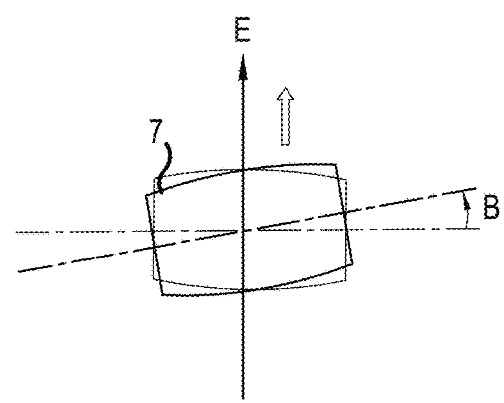
FIG. 3*b* is a top view of an exemplifying embodiment of a rolling element presenting a positive skew angle.

FIG. 3*b* depicts a top view of an exemplifying embodiment of a rolling element 7 presenting a positive skew angle B. The rolling element is viewed from a central radial axis of the rolling element 7. Here, the rolling element 7 is a roller 7. The roller 7 can be seen having a roller 7 direction as shown by the block arrow. Further, an orbital trajectory of rotation E is shown. By orbital trajectory of rotation E of the set of rolling elements 4 is meant the mean average angle the rolling elements 7 of the set of rolling elements 4 are having when seen from a central radial axis extending through an axial center portion of the rolling elements 7 as they travel a full lap around the bearing's 1 rotational center axis C. It should be understood that the individual rolling elements 7 may skew and turn to slightly different directions as they travel through the loaded and unloaded zone, thereby presenting a different angle when seen from radial axis extending from an axial center portion of the rolling element, due to a space 6*a* for turning of the rolling elements 7 being provided within each pocket 6, as described below. Here, a roller 7 from the bearing 1 in FIG. 2*a* can be seen from its radial axis presenting a positive skew B is it is in a loaded zone of the bearing 1.

Figure 3C:
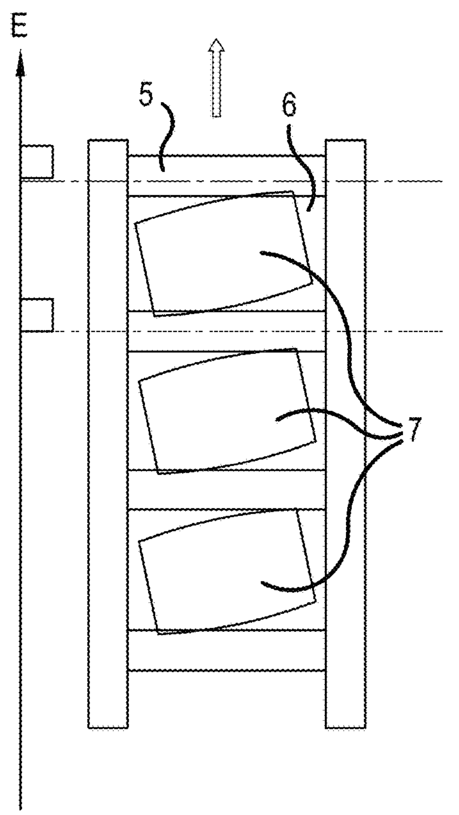
FIG. 3*c* is a top view of an exemplifying embodiment of a rolling element presenting a positive skew angle together with a cage having symmetrical cage pockets, according to prior art.

FIG. 3*c* depicts a top view of an exemplifying embodiment of a rolling elements presenting a positive skew angle B together with a cage 5 having symmetrical cage pockets 6, according to prior art. The rollers 7 can be seen having a roller 7 direction as shown by the block arrow. Further, an orbital trajectory of rotation E is shown. Here, the rolling element from FIGS. 2*a* and 2*b* can be seen in a loaded zone of a bearing 1 (not shown) in relation to a cage 5 of prior art having symmetrical cage pockets 6. By symmetrical pocket 6 is meant a cage pocket 6 that extends symmetrically direction perpendicular to the orbital trajectory of rotation E. As can be seen, the roller 7 presents a skew angle B and the symmetrical cage pocket 6 does not encompass the movement of the roller 7, causing friction and wear in the contact areas of the roller 7 and the cage 5. Further, the cage pocket 6 inhibits the roller's 7 ability to self-orient in its axial direction in relation to the inner ring 2 and outer ring 3 in a loaded zone during operation to take an optimum position based on the current load conditions. This further inhibits the performance of the bearing 1 in its load carrying abilities, causing more friction of the bearing 1 overall and decreasing the performance of the machinery 11 in which the bearing 1 is installed.

Figure 3D:
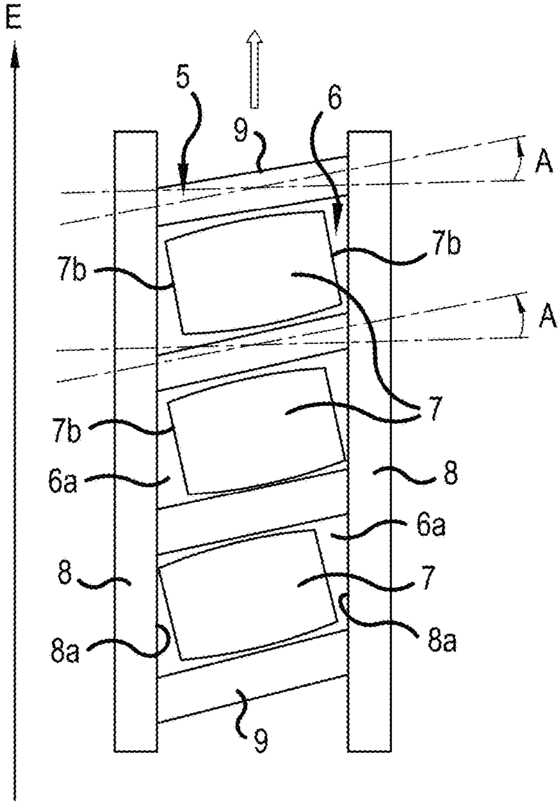
FIG. 3*d* is a top view of an exemplifying embodiment of a rolling element presenting a positive skew angle together with a cage having pockets presenting an inclination angle, according to the present invention.

FIG. 3*d* depicts a top view of an exemplifying embodiment of a rolling elements presenting a positive skew angle B together with a cage 5 having pockets 6 presenting an inclination angle A, according to the present invention. The cage 5 includes two side members 8 and a plurality of cross members 9 connecting the two side members 8, each cross member 8 being angled to establish the cage pocket inclination angle A. Each side member 8 has a surface 8*a* partially defining each pocket 6 which extends along the orbital trajectory of rotation E such that the space 6*a* for turning the rolling elements 7 is provided within each pocket 6 at the axial ends 7*b* of the rollers 7. Here, the rolling elements from FIG. 2*c* can be seen in a loaded zone of a bearing 1 (not shown). The cage pocket 6 can be seen presenting an the inclination angle A, thereby encompassing the skew angle B of the roller 7 to a higher degree. As such, the problems with friction and wear as explained in FIG. 2*c* is significantly reduced. Further, the inclination angle A of the cage pockets 6 help to steer the rollers 7 in the unloaded zone into a skew angle B to quicker find its optimum axial position as it enters the loaded zone. As such, the cage 5 and the rollers 7 may of course be in contact in the unloaded zone as the cage pockets 6 steer the roller 7, but the generated forces and wear is significantly less compared to when the rollers 7 are in the loaded zone. The cage 5 and the rollers 7 may be in contact in the loaded zone as well, yet the inclination angle A reduces the problems with friction and wear as explained above, compared to symmetrical cage pockets 6. Optionally, the pocket 6 inclination angle A corresponds to the estimated roller 7 skew angle B in FIG. 2*b*.

Figure 4:
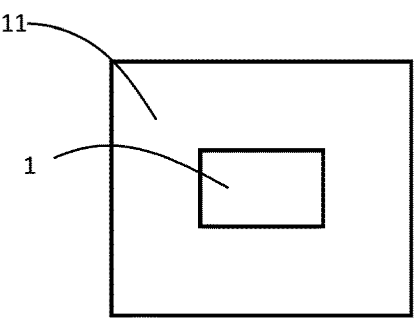
FIG. 4 is a schematic view of a machinery comprising an angular contact self-aligning toroidal rolling element bearing according to the present invention.

FIG. 4 depicts a schematic view of a machinery 11 comprising an angular contact self-aligning toroidal rolling element bearing 1 according to the present invention. Typically, the machinery 11 is a is a machinery 11 exposed to alternating radial and alternating axial loads, such as a wind turbine. The rotating direction of a main shaft of a wind turbine can be also be controlled so that it always rotates at a specific rotating direction by adjusting the slew angle of the blades. This makes the wind turbine a suitable application for an angular contact bearing 1 according the an embodiment of the present invention, as the skew angle B of the rolling elements may be estimated in a reliable manner It should be understood however that also other applications and/or machinery 11 where the rotating direction of the shaft is known are suitable for an angular contact self-aligning toroidal rolling element bearing 1 according to any one of the embodiments as presented herein.

For example, even though the angular contact self-aligning toroidal rolling element bearing 1 has mainly been described in relation to a standalone configuration, it may be utilized in a wide range of applications, including but not limited to turbines, mills, and other machines including rotating shafts with axial and radial support requirements where the intended rotating direction of the shaft is known.

Figure 5:
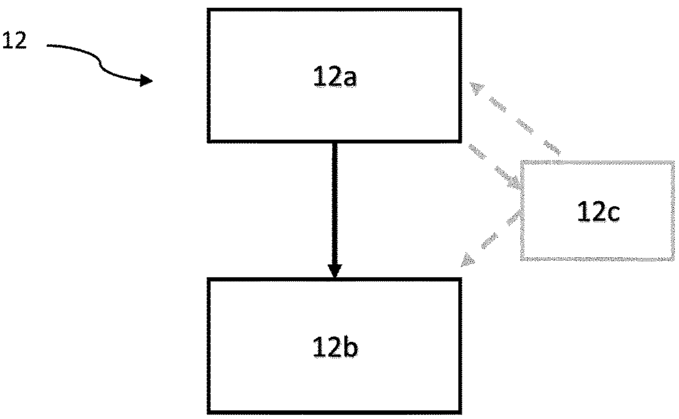
FIG. 5 is a schematic flow chart of an exemplifying embodiment of a method according to the present invention.

FIG. 5 depicts a schematic flow chart of an exemplifying embodiment of a method 12 according to the present invention. The method 12 is a method 12 for manufacturing an angular contact self-aligning toroidal rolling element bearing 1 according to an embodiment of the present invention. The method 12 comprising steps of:

providing 12*a* an angular contact self-aligning toroidal rolling element bearing 1 comprising an inner ring 2, an outer ring 3 and a set of rolling elements 4, further providing 12*b* a cage 5 with cage pockets 6, each cage pockets 6 for retaining a rolling element of the set of rolling elements 4, wherein at least one cage pocket 6 presents and inclination angle A in relation to an orbital trajectory of rotation E of the set of rolling elements 4 during operation.

The cage 5 may be a window type cage or a crown type cage, or any other type of cage suitable for retaining the set of rolling elements 4. The cage 5 may be made in one piece, be a segmented cage 5, or be made from assembling different cage elements together, or combinations thereof.

Optionally, the method 12 comprises further providing 12*b* a cage pocket 6 inclination angle A that substantially corresponds to a roller skew angle B of the rollers 7 in the loaded zone in relation to the orbital trajectory of rotation E of the set of rolling elements 4 during operation.

The roller skew angle B can be estimated for a particular application using bearing design rules to simulate the behavior of the bearing 1. By using input such as the rotating direction of the shaft, estimated load conditions of the bearing 1 depending on the application or machinery 11 in which it is installed, and the internal geometry of the bearing 1, an optimum roller skew angle B in the loaded zone can be estimated. As such, an optional further step may be to estimate 12*c* a roller skew angle B using bearing 1 design rules. Then, the further step of providing 12*b* a cage 5 with cage pockets 6, each cage pockets 6 for retaining a rolling element of the set of rolling elements 4, wherein at least one cage pocket 6 presents and inclination angle A in relation to an orbital trajectory of rotation E of the set of rolling elements 4 during operation, the inclination angle A can be the same as for the estimated optimum roller skew angle B in the loaded zone. This may be particularly relevant for customized applications that are not yet known to the bearing 1 manufacturer or the machinery 11 owner where the running conditions are not yet known. Of course, for typical applications already known to the bearing 1 manufacturers or the machinery 11 owner, or any other actor involved for installing the bearing 1, this step may be omitted.

Optionally, the method 12 comprises further providing 12*b* a cage pocket inclination angle A ranging from 0.1 milli-radians to 20 milli-radians, or from −0.1 milli-radians to −20 milli-radians. As such, the cage pocket inclination angle A may range from 0.1 milli-radians to 10 milli-radians, or from −0.1 milli-radians to −10 milli-radians. The cage pocket inclination may also range from 5 milli-radians to 20 milli-radians, or from −5 milli-radians to −20 milli-radians. The cage pocket inclination angle A may also range from 10 milli-radians to 20 milli-radians, or from −10 milli-radians to −20 milli-radians. The cage pocket inclination angle A may also range from 15 milli-radians to 20 milli-radians, or from −15 milli-radians to −20 milli-radians.

FIG. 6 depicts a schematic view of a torus shape in combination with a rolling element bearing 1. As shown, the curvature of the bearing 1 raceways forms a torus geometry. The illustrated bearing 1 is a toroidal bearing 1 with zero contact angle.

It should be noted that the invention has mainly been described above with reference to a few embodiments. However, as is readily appreciated by a person skilled in the art, other embodiments than the ones disclosed above are equally possible within the scope of the invention, as defined by the appended patent claims.

For example, even though the angular contact self-aligning toroidal rolling element bearing 1 has been mainly been described in relation to a stand alone configuration, it may be utilized in a wide range of applications, including but not limited to turbines, mills, and other machines including rotating shafts with axial and radial support requirements.

In the claims, the word "comprising" does not exclude other elements or steps, and the indefinite article "a" or "an" does not exclude a plurality. A single apparatus or other unit may fulfill the functions of several items recited in the claims. The mere fact that certain features or method steps are recited in mutually different dependent claims does not indicate that a combination of these features or steps cannot be used to advantage.

The invention claimed is:

1. An angular contact self-aligning toroidal rolling element bearing comprising:

an inner ring having a curved inner raceway, an outer ring having a curved outer raceway, a set of rollers arranged between the inner ring and outer ring, and a cage including a plurality of pockets, each pocket retaining one roller of the set of rollers, wherein each roller has a curved raceway-contacting surface arranged for being in load carrying contact with the curved inner raceway of the inner ring and in load carrying contact with the curved outer raceway of the outer ring, a contact angle between each roller and the inner raceway and/or a contact angle between each roller and the outer raceway being inclined in relation to a bearing axis, wherein each roller is arranged to self-orient in an axial direction of the roller in relation to the inner ring and the outer ring in a loaded zone during operation of the bearing, and wherein at least one of the pockets define a cage pocket inclination angle in relation to an orbital trajectory of rotation of the set of rollers;

wherein the cage includes two side members and a plurality of cross members extending axially between and connecting the two side members, each cross member being angled to establish the cage pocket inclination angle, each side member having a surface partially defining each pocket which extends along the orbital trajectory of rotation such that a space for turning of the rolling elements is provided within each pocket at the axial ends of each rolling element.

2. The angular contact self-aligning toroidal rolling element bearing according to claim 1, wherein the cage pocket inclination angle substantially corresponds to a roller skew angle of the rollers in the loaded zone of the bearing in relation to the orbital trajectory of rotation of the set of rolling elements.

3. The angular contact self-aligning toroidal rolling element bearing according to claim 1, wherein the cage pocket inclination angle has a value within a range of 0.1 milli-radians to 20 milli-radians or within a range of −0.1 milli-radians to −20 milli-radians.

4. The angular contact self-aligning toroidal rolling element bearing according to claim 1, wherein the contact angle has a value of 5 degrees or more.

5. The angular contact self-aligning toroidal rolling element bearing according to claim 1, wherein the bearing has an external diameter of 500 mm or more.

6. The angular contact self-aligning toroidal rolling element bearing according to claim 1, wherein the contact angle has a value of 20 degrees or more.

7. A machine comprising an angular contact self-aligning toroidal rolling element bearing according to claim 1.

8. The machine according to claim 7, wherein the machine is exposed to alternating radial and alternating axial loads.

9. The machine according to claim 8, wherein the machine is a wind turbine.

10. A method for manufacturing an angular contact self-aligning toroidal rolling element bearing, the method comprising the steps of:

providing a bearing including an inner ring, an outer ring, a set of rolling elements formed as rollers arranged between the inner ring and outer ring, each roller having a curved raceway-contacting surface arranged for being in load carrying contact with a curved inner raceway of the inner ring and in load carrying contact with a curved outer raceway of the outer ring, a contact angle between each roller and the inner raceway and/or the outer raceway being inclined in relation to a bearing axis, and each roller is arranged to self-orient in its axial direction in relation to the inner ring and the outer ring in a loaded zone during operation of the bearing, and providing a cage including a plurality of pockets, each pocket retaining a separate roller of the set of rolling elements, wherein at least one of the pockets defines a cage pocket inclination angle in relation to an orbital trajectory of rotation of the set of rolling elements, the cage including two side members and a plurality of cross members extending axially between and connecting the two side members, each cross member being angled to establish the cage pocket inclination angle, each side member having a surface partially defining each pocket which extends along the orbital trajectory of rotation such that a space for turning of the rolling elements is provided within each pocket at the axial ends of each rolling element.

11. The method for manufacturing an angular contact self-aligning toroidal rolling element bearing according to claim 10, wherein the cage pocket inclination angle substantially corresponds to a roller skew angle of the rollers in a loaded zone of the bearing in relation to the orbital trajectory of rotation of the set of rolling elements.

12. The method for manufacturing an angular contact self-aligning toroidal rolling element bearing according to claim 10, further comprising a step of estimating an optimum roller skew angle using bearing design rules before performing the step of providing the bearing or before performing the step of providing the cage.

13. The method for manufacturing an angular contact self-aligning toroidal rolling element bearing according to claim 10, further comprising the steps of:

installing the set of rolling elements within the plurality of pockets of the cage; and installing the cage between the inner ring of the bearing and between the outer ring of the bearing.

* * * * *